(12) United States Patent
Mimassi

(10) Patent No.: US 11,699,122 B2
(45) Date of Patent: Jul. 11, 2023

(54) SYSTEM AND METHOD FOR MATCHING PATRONS, SERVERS, AND RESTAURANTS WITHIN THE FOOD SERVICE INDUSTRY

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

(21) Appl. No.: 17/710,990

(22) Filed: Mar. 31, 2022

(65) Prior Publication Data

US 2022/0230122 A1   Jul. 21, 2022

Related U.S. Application Data

(63) Continuation-in-part of application No. 17/571,459, filed on Jan. 8, 2022, which is a continuation of
(Continued)

(51) Int. Cl.
*G06Q 10/0639* (2023.01)
*G06Q 50/12* (2012.01)
(Continued)

(52) U.S. Cl.
CPC ... *G06Q 10/06398* (2013.01); *G06F 16/9035* (2019.01); *G06F 18/23* (2023.01);
(Continued)

(58) Field of Classification Search
CPC ....... G06Q 10/06398; G06Q 10/06393; G06Q 10/06395; G06Q 50/12; G06F 16/9035; G06N 20/00; G06K 9/6218
See application file for complete search history.

(56) References Cited

U.S. PATENT DOCUMENTS 8,463,295 B1 * 6/2013 Caralis ................. G06Q 50/01
705/14.54
9,087,364 B1   7/2015 Gluck
(Continued)

FOREIGN PATENT DOCUMENTS

CN   107766404 A *   3/2018   .......... G06F 16/3326

OTHER PUBLICATIONS

Perez "Google Maps now uses machine learning to find restaurants' best dishes, make suggestions" (2019) (https://techcrunch.com/2019/05/30/google-maps-now-uses-machine-learning-to-find-restaurants-best-dishes-make-suggestions/) (Year: 2019).*

*Primary Examiner* — Sujay Koneru
(74) *Attorney, Agent, or Firm* — Galvin Patent Law LLC; Brian R. Galvin; Brian S. Boon

(57) ABSTRACT

A system and method of combining table management software and customer experience skills by generating profiles of patrons, servers, and restaurants by using machine learning algorithms on and location data in those profiles to build more intimate relationships between patrons, food service establishments, and food service professionals. Trait matching provides optimized matchmaking between patrons and servers who share certain commonalities or affinities while also balancing the table management operations. Machine learning algorithms may be used to identify patterns of commonality that would not otherwise be recognized. This system allows patrons to choose servers at an establishment over a plurality of electronic devices by using the cluster analysis results. It provides servers more lateral work experience between participating restaurants, and restaurants more power to operate smoothly and build highly cohesive teams.

8 Claims, 14 Drawing Sheets

Related U.S. Application Data application No. 16/950,068, filed on Nov. 17, 2020, now Pat. No. 11,222,297, which is a continuation of application No. 17/097,443, filed on Nov. 13, 2020, now Pat. No. 11,257,105, which is a continuation-in-part of application No. 17/091,925, filed on Nov. 6, 2020, now Pat. No. 11,334,866, which is a continuation-in-part of application No. 17/005,038, filed on Aug. 27, 2020, now Pat. No. 11,232,426, which is a continuation-in-part of application No. 16/796,342, filed on Feb. 20, 2020, now Pat. No. 10,803,442.

(60) Provisional application No. 63/073,814, filed on Sep. 2, 2020, provisional application No. 63/070,895, filed on Aug. 27, 2020, provisional application No. 62/964,413, filed on Jan. 22, 2020, provisional application No. 62/938,817, filed on Nov. 21, 2019.

(51) Int. Cl.
*G06N 20/00* (2019.01)
*G06F 16/9035* (2019.01)
*G06F 18/23* (2023.01)

(52) U.S. Cl.
CPC ....... *G06N 20/00* (2019.01); *G06Q 10/06393* (2013.01); *G06Q 10/06395* (2013.01); *G06Q 50/12* (2013.01)

(56) References Cited

U.S. PATENT DOCUMENTS

| | | | |
|---|---|---|---|
| 10,855,858 B1* | 12/2020 | Stopa | G06F 3/1285 |
| 2009/0030932 A1* | 1/2009 | Harik | G06Q 10/10 |
| | | | 707/999.102 |
| 2010/0161432 A1 | 6/2010 | Kumanov et al. | |
| 2014/0278611 A1* | 9/2014 | Russell | G06Q 50/12 |
| | | | 705/5 |
| 2015/0317756 A1* | 11/2015 | Agiv | G06Q 30/02 |
| | | | 705/7.35 |
| 2015/0317835 A1* | 11/2015 | Byers | G06V 40/20 |
| | | | 345/633 |
| 2015/0379649 A1* | 12/2015 | Sullivan | G06Q 10/063112 |
| | | | 705/7.14 |
| 2016/0246901 A1* | 8/2016 | Kashyap | G06F 16/9024 |
| 2016/0292299 A1* | 10/2016 | Diwakar | G06F 16/9024 |
| 2019/0073420 A1* | 3/2019 | Agapiev | G06F 16/9024 |
| 2019/0340537 A1 | 11/2019 | Fung et al. | |

* cited by examiner

SYSTEM AND METHOD FOR MATCHING PATRONS, SERVERS, AND RESTAURANTS WITHIN THE FOOD SERVICE INDUSTRY

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/571,459
Ser. No. 16/950,068
Ser. No. 17/097,443
63/073,814
Ser. No. 17/091,925
63/070,895
Ser. No. 17/005,038
62/964,413
Ser. No. 16/796,342
62/938,817

BACKGROUND

Field of the Art

The disclosure relates to the field of automated customer service systems, and more particularly to the field of customer detection and profiling using wireless-enabled mobile devices.

Discussion of the State of the Art

Modern-day restaurants who are looking to turn a profit need to master both customer experience and table management. While these skills are distinct, they are also inextricable. Current table management software focuses solely on logistics such as floor plans and predicting wait times and is engineered entirely from the restaurant's point of view which leaves the customer experience completely up to the server.

While every restaurant desires a constant stream of regulars, turning one-time patrons into loyal customers requires extended periods of time and retention rate of staff who can then build rapport, both of which are scarce in the fast-paced restaurant industry. The high turnover rate of servers diminishes a restaurant's ability to build these lasting relationships with its customers, whereas professional servers also need to the ability to seek more favorable establishments if their skills are in high demand or in order to reduce burnout.

What is needed is a system and method of combining table management and customer experience by generating profiles of patrons, servers, and restaurants by using machine learning algorithms and location data on those profiles to build more intimate relationships between patrons and food service establishments and professionals.

SUMMARY

Accordingly, the inventor has conceived and reduced to practice, a system and method of combining table management software and customer experience skills by generating profiles of patrons, servers, and restaurants by using machine learning algorithms and location data in those profiles to build more intimate relationships between patrons, food service establishments, and food service professionals. This system gives patrons new choices over their dining experience, servers more lateral movement between participating restaurants, and restaurants more power to operate smoothly and build highly cohesive teams. Trait matching provides optimized matchmaking between patrons and servers who share certain commonalities while also balancing the table management operations. Machine learning algorithms may be used to identify patterns of commonality that would not otherwise be recognized. This system allows patrons to choose servers at an establishment over a plurality of electronic devices by using the cluster analysis results. It provides servers more lateral work experience between participating restaurants, and restaurants more power to operate smoothly and build highly cohesive teams.

According to a first preferred embodiment, a system for matching patrons with servers and restaurants is disclosed, comprising: a computing device comprising a memory, a processor, and a non-volatile data storage device; a database residing on the non-volatile data storage device, the database comprising profiles of patrons, servers, and restaurants; a portal comprising a first plurality of programming instructions stored in the memory, and operating on the processor, wherein the first plurality of programming instructions, when operating on the processor, causes the computing device to: receive information about a patron, server, and restaurant; store the received information in the relevant profile belonging to the patron, server, or restaurant in the database; receive a unique identifier and a match request from a patron's mobile device, the unique identifier linked to a specific patron; match the specific patron to a plurality of potential servers, restaurants, or both according to the match request using a profile mapping and recommendation engine; present the plurality of potential matches to the patron's mobile device; receive a match selection from the patron's mobile device; and a profile mapping and recommendation engine comprising a second plurality of programming instructions stored in the memory, and operating on the processor, wherein the second plurality of programming instructions, when operating on the processor, causes the computing device to: retrieve the specific patron's profile from the database; retrieve a plurality of the server profiles from the database; retrieve a plurality of the restaurant profiles from the database; process the specific patron's profile, the plurality of server profiles, and the plurality of restaurant profiles through a computational graph and use graph analysis algorithms to identify the highest-associated server and restaurant profiles in relation to the specific patron's profile; and send the highest-associated server and restaurant profiles to the portal.

According to a second preferred embodiment, a method for matching patrons with servers and restaurants is disclosed, comprising the steps of: receiving information about a patron, server, and restaurant; storing the received information in a relevant profile belonging to the patron, server, or restaurant in a database; receiving a unique identifier and a match request from a patron's mobile device, the unique identifier linked to a specific patron; matching the specific patron to a plurality of potential servers, restaurants, or both according to the match request using a profile mapping and recommendation engine; retrieving the specific patron's profile from the database; retrieving a plurality of the server profiles from the database; retrieving a plurality of the restaurant profiles from the database; processing the specific patron's profile, the plurality of server profiles, and the plurality of restaurant profiles through a computational graph and using graph analysis algorithms to identify the highest-associated server and restaurant profiles in relation to the specific patron's profile; presenting the plurality of potential matches to the patron's mobile device; and receiving a match selection from the patron's mobile device.

According to various aspects: wherein the profiles in the database further comprise location information; wherein a portion of the information for the patron, server, or restaurant profiles is received from a social media account; wherein GPS data is received from the patron's mobile device and stored in the patron's profile; wherein the graph analysis algorithms operating on the computational graph infer a patron's affinity for visiting an establishment or towards a particular profile attribute; wherein the patron's affinity is used to adjust the weights of the computational graph; and wherein the affinity-adjusted computational graph is used in identifying the highest-associated server and restaurant profiles.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 1 a block diagram illustrating an exemplary system architecture for a patron-server matching system.

Figure 6:
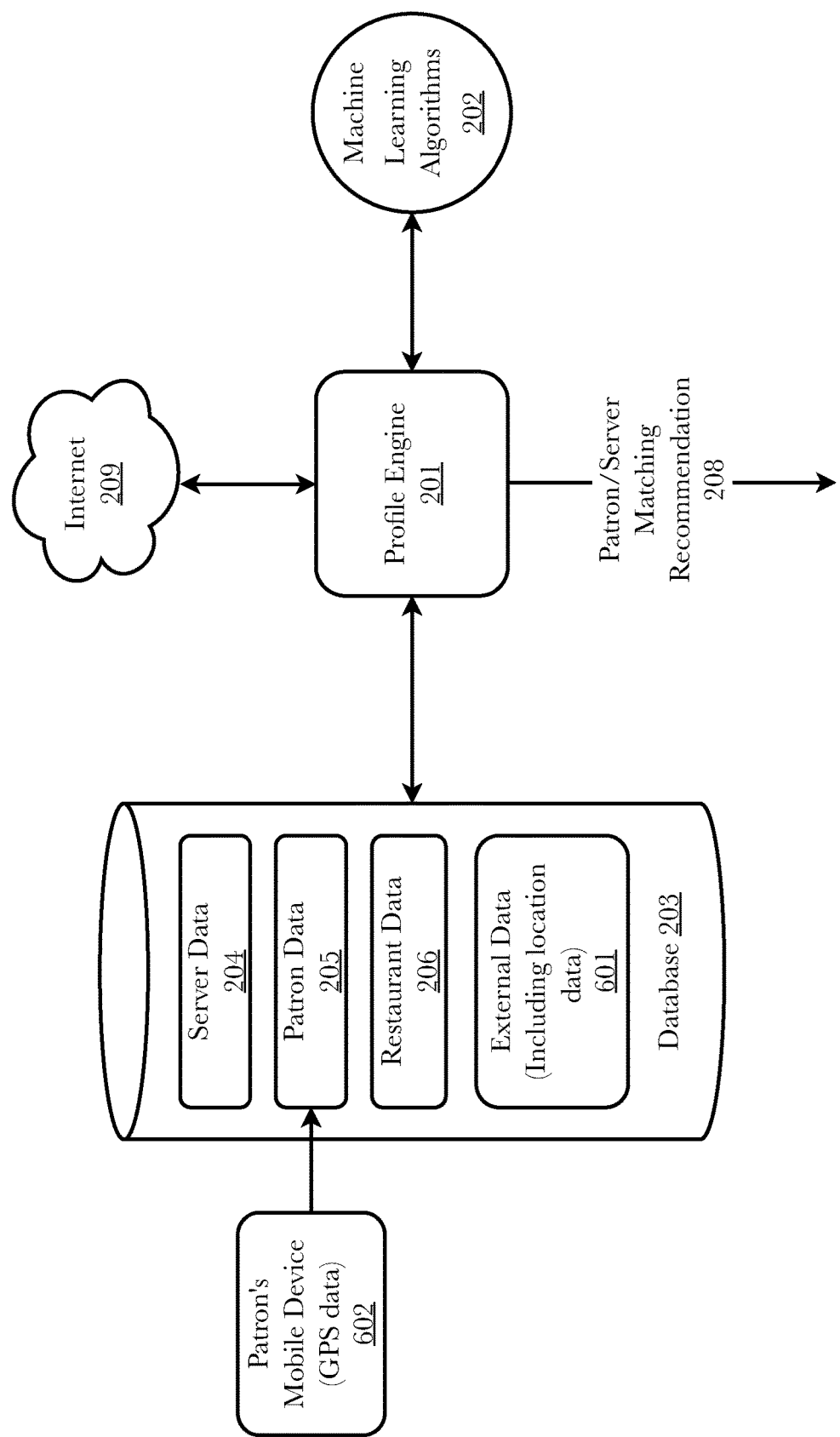

FIG. 6 a block diagram illustrating an exemplary system architecture for a location-informed matching system.

Figure 7:
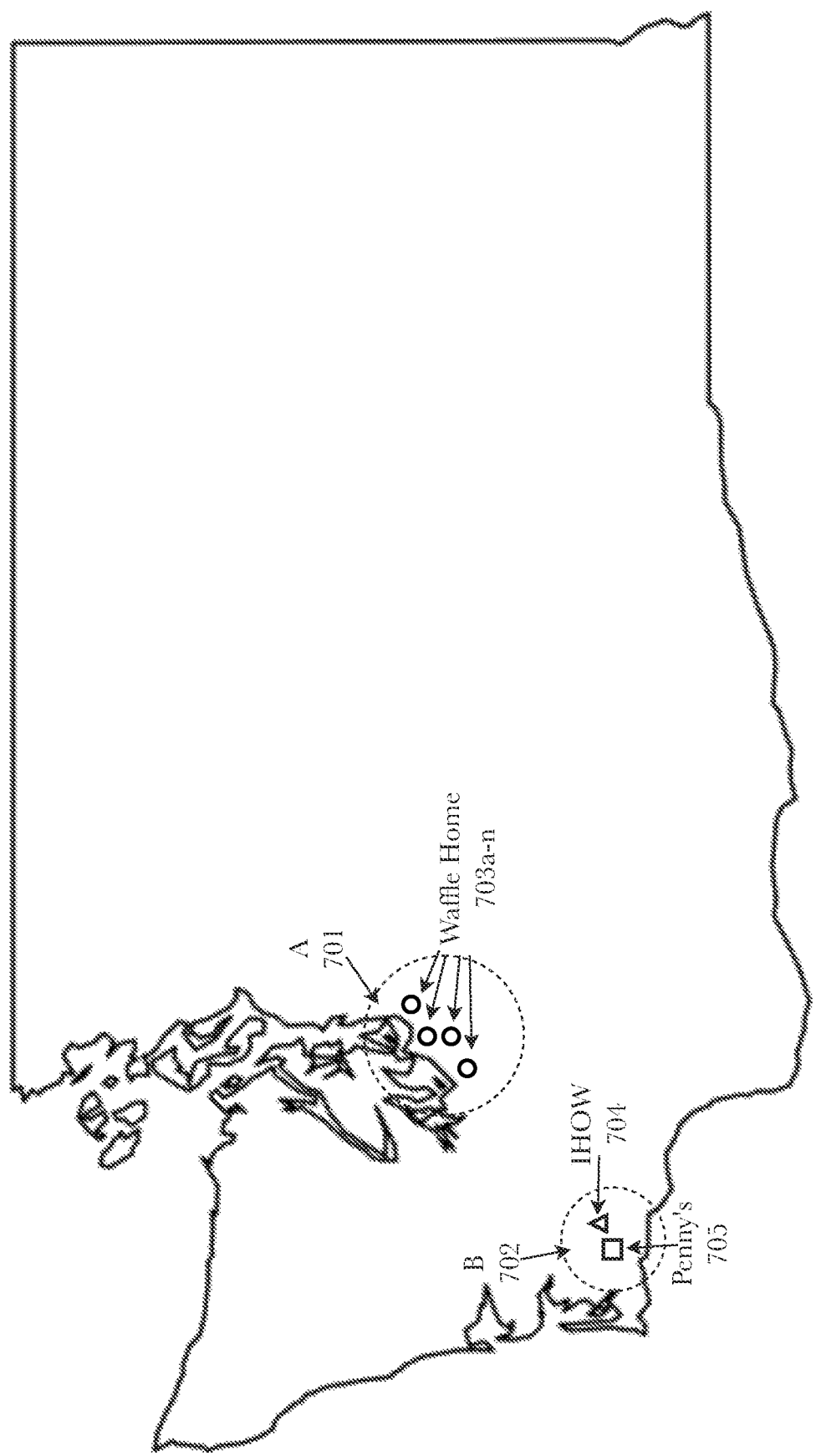

FIG. 7 is a diagram of an exemplary computational location graph superimposed on a regional outline for illustrating the use of location data analysis for patron-restaurant matchmaking.

Figure 8:
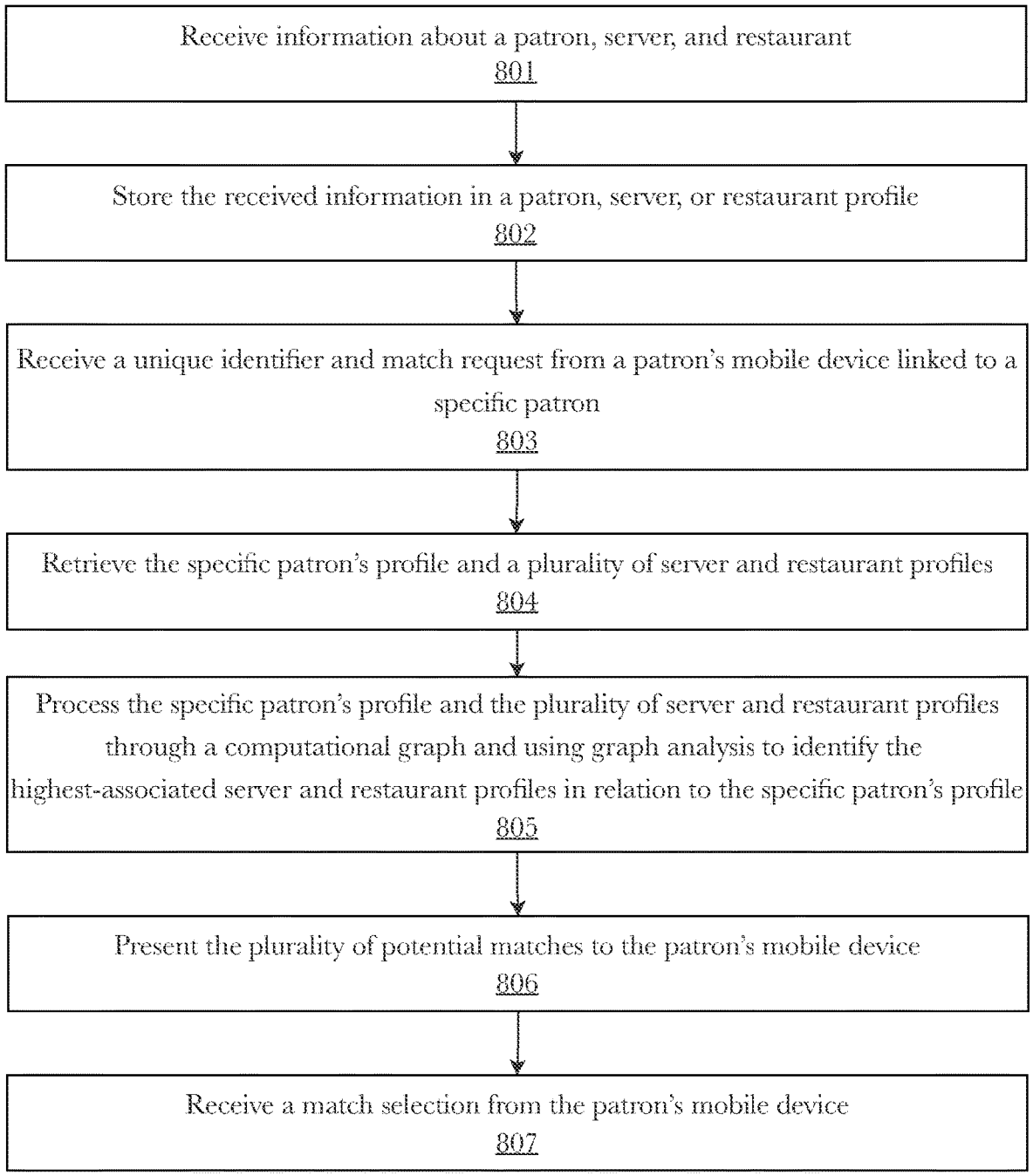

FIG. 8 is a flow diagram illustrating an exemplary method for matching patrons, servers, and restaurants.

Figure 9:
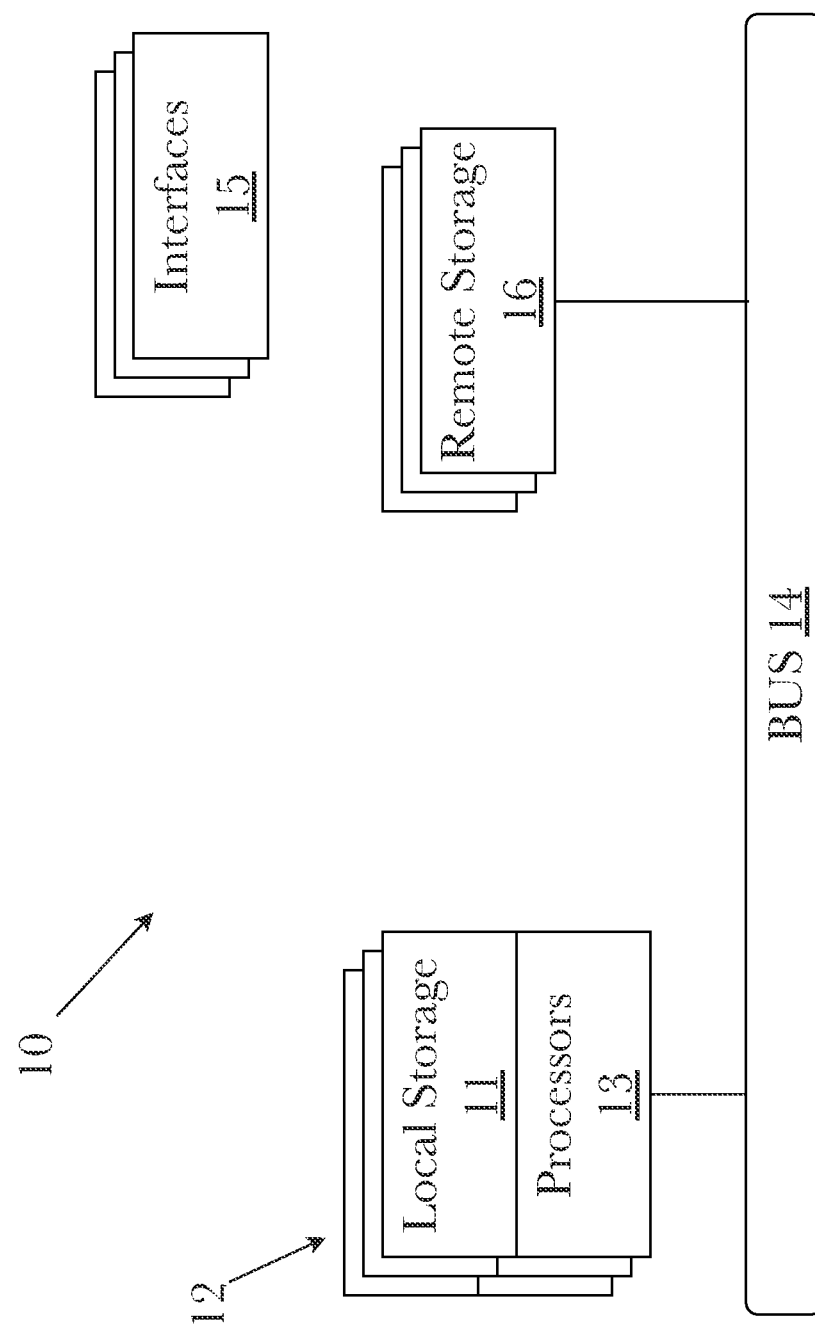

FIG. 9 is a block diagram illustrating an exemplary hardware architecture of a computing device.

Figure 10:
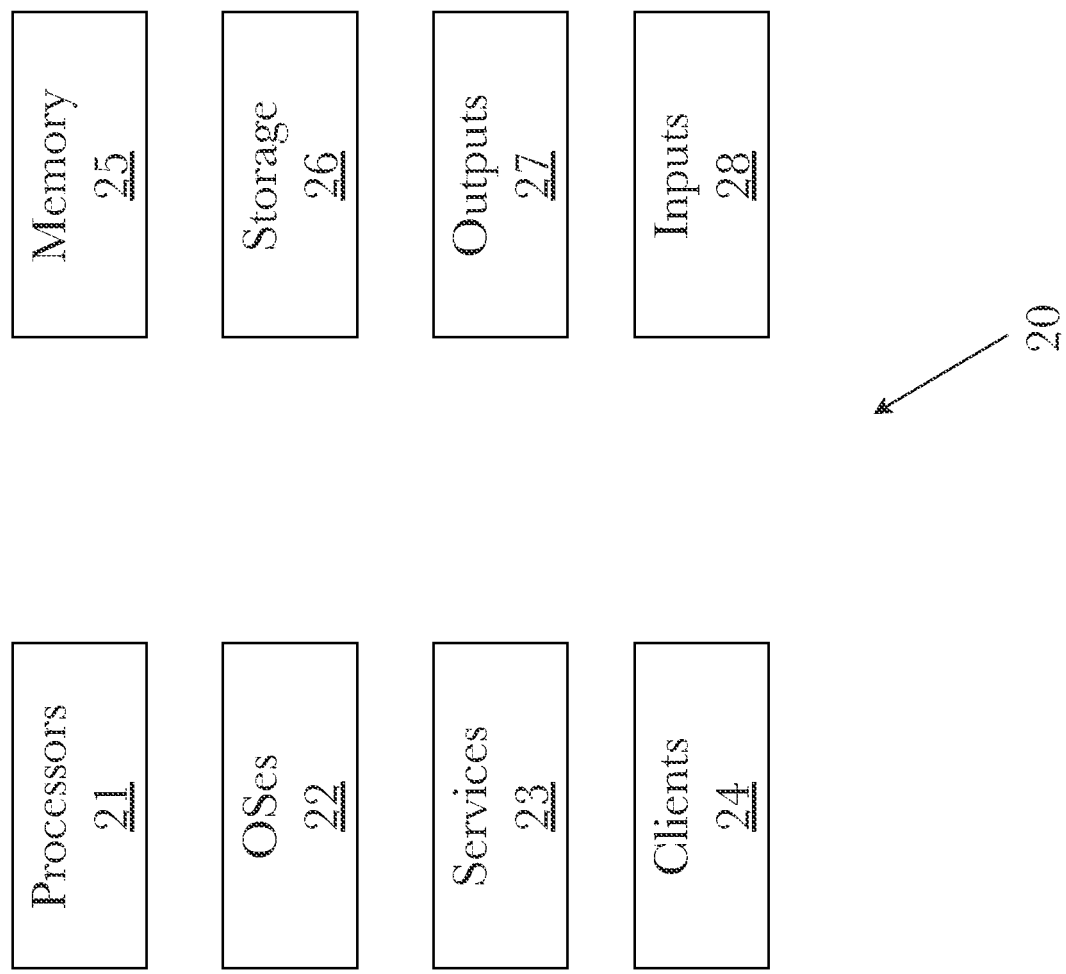

FIG. 10 is a block diagram illustrating an exemplary logical architecture for a client device.

Figure 11:
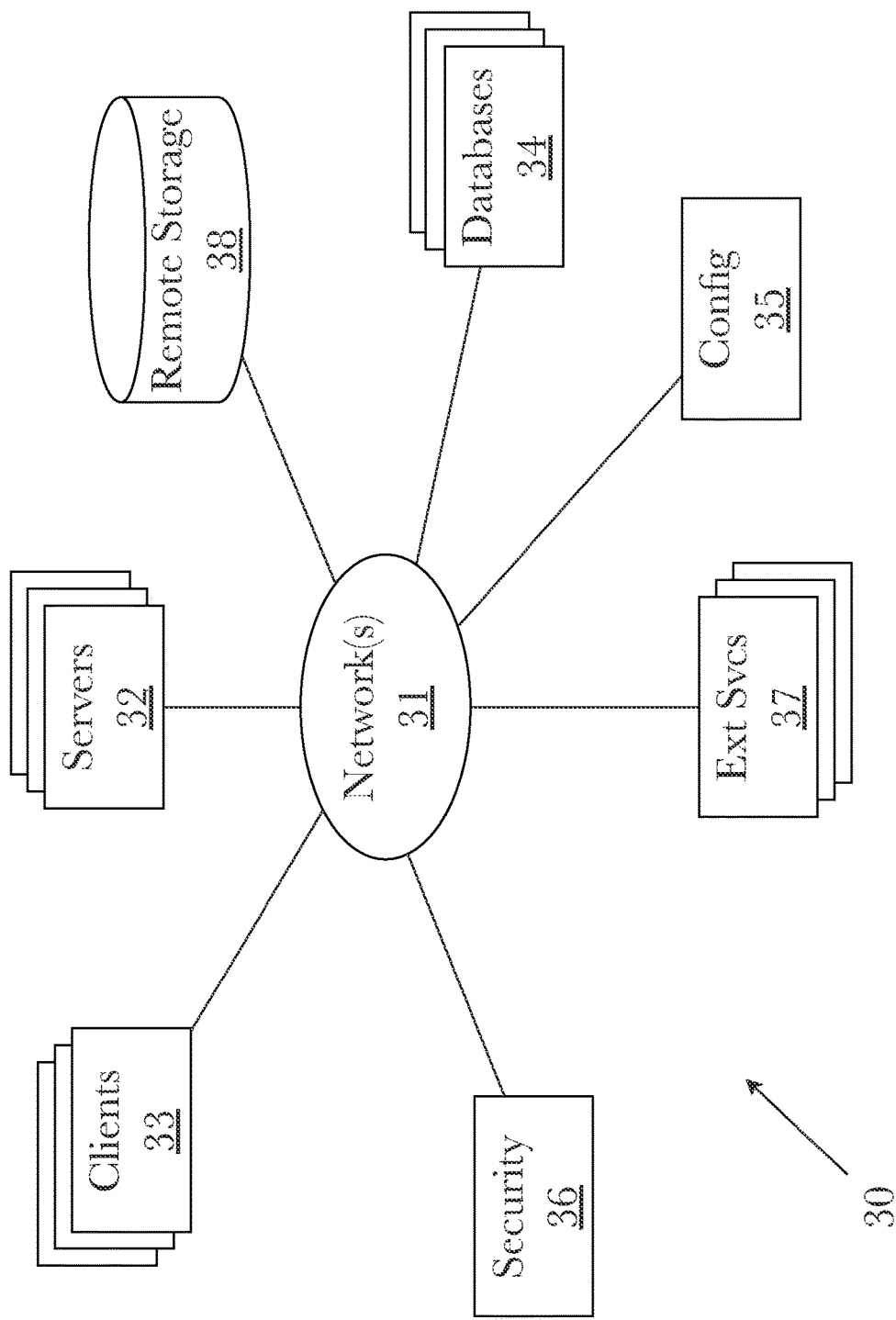

FIG. 11 is a block diagram showing an exemplary architectural arrangement of clients, servers, and external services.

Figure 12:
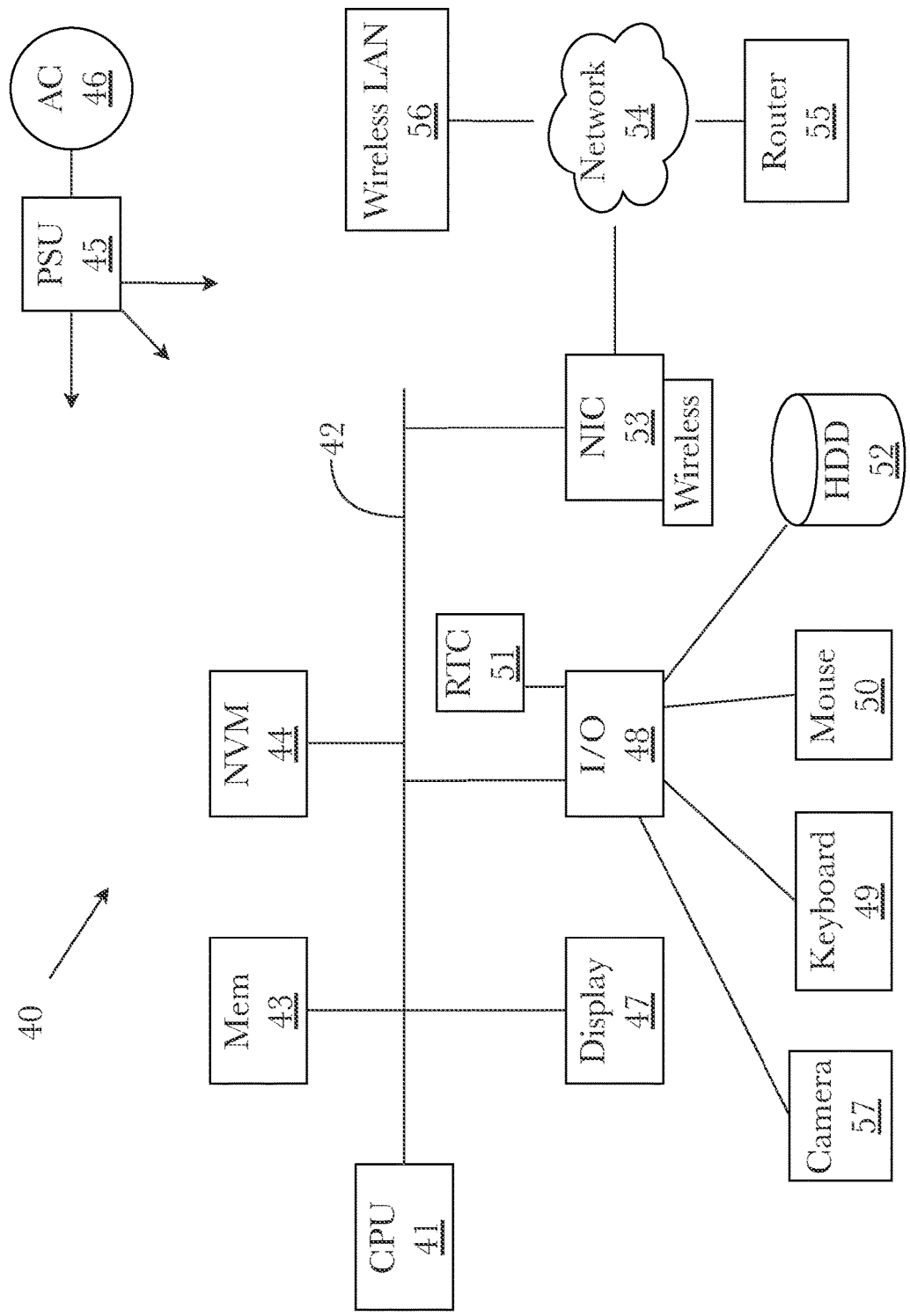

FIG. 12 is another block diagram illustrating an exemplary hardware architecture of a computing device.

DETAILED DESCRIPTION

The inventor has conceived, and reduced to practice, a system and method of combining table management software and customer experience skills by generating profiles of patrons, servers, and restaurants by using machine learning algorithms on and location data in those profiles to build more intimate relationships between patrons, food service establishments, and food service professionals. This system gives patrons new choices over their dining experience, servers more lateral movement between participating restaurants, and restaurants more power to operate smoothly and build highly cohesive teams. Trait matching provides optimized matchmaking between patrons and servers who share certain commonalities while also balancing the table management operations. Machine learning algorithms may be used to identify patterns of commonality that would not otherwise be recognized. This system allows patrons to choose servers at an establishment over a plurality of electronic devices by using the cluster analysis results. It provides servers more lateral work experience between participating restaurants, and restaurants more power to operate smoothly and build highly cohesive teams.

A profile mapping and recommendation engine, when given enough information about their servers and customers, provides recommendations on which servers may be a good fit with the customer as well as balancing the server to customer ratio. Customers register their mobile devices with a restaurant and when the customer visits, he or she gets automatically matched with a server who shares common traits or that they've ranked highly in the past. They may also choose to try a new server and select a server based on the context of their visit. Other algorithms may be used to match patrons with servers and servers with restaurants.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, but may also be a business without a physical location such as an online or telephone order retailer. Many examples herein use a restaurant as the business establishment, but the invention is not limited to use in restaurants, and is applicable to any business establishment.

The term "network" as used herein means any communication connection between two or more computing devices, whether such connection is made directly (e.g., from one device containing a Bluetooth radio to another device containing a Bluetooth radio) or through an intermediary device such as a router, where a number of devices connected to the router may all communicate with one another.

"Server" or "Waitstaff" as used herein are individuals who work at a restaurant, bar, or other business establishment, attending to customers by supplying them with food and drink as requested. Servers may take on additional roles such as clearing and setting tables, greeting customers, or duties in the kitchen. Where the term "server" is used in the context of computer hardware, it shall have the meaning associated with computer hardware.

Conceptual Architecture

Figure 1:
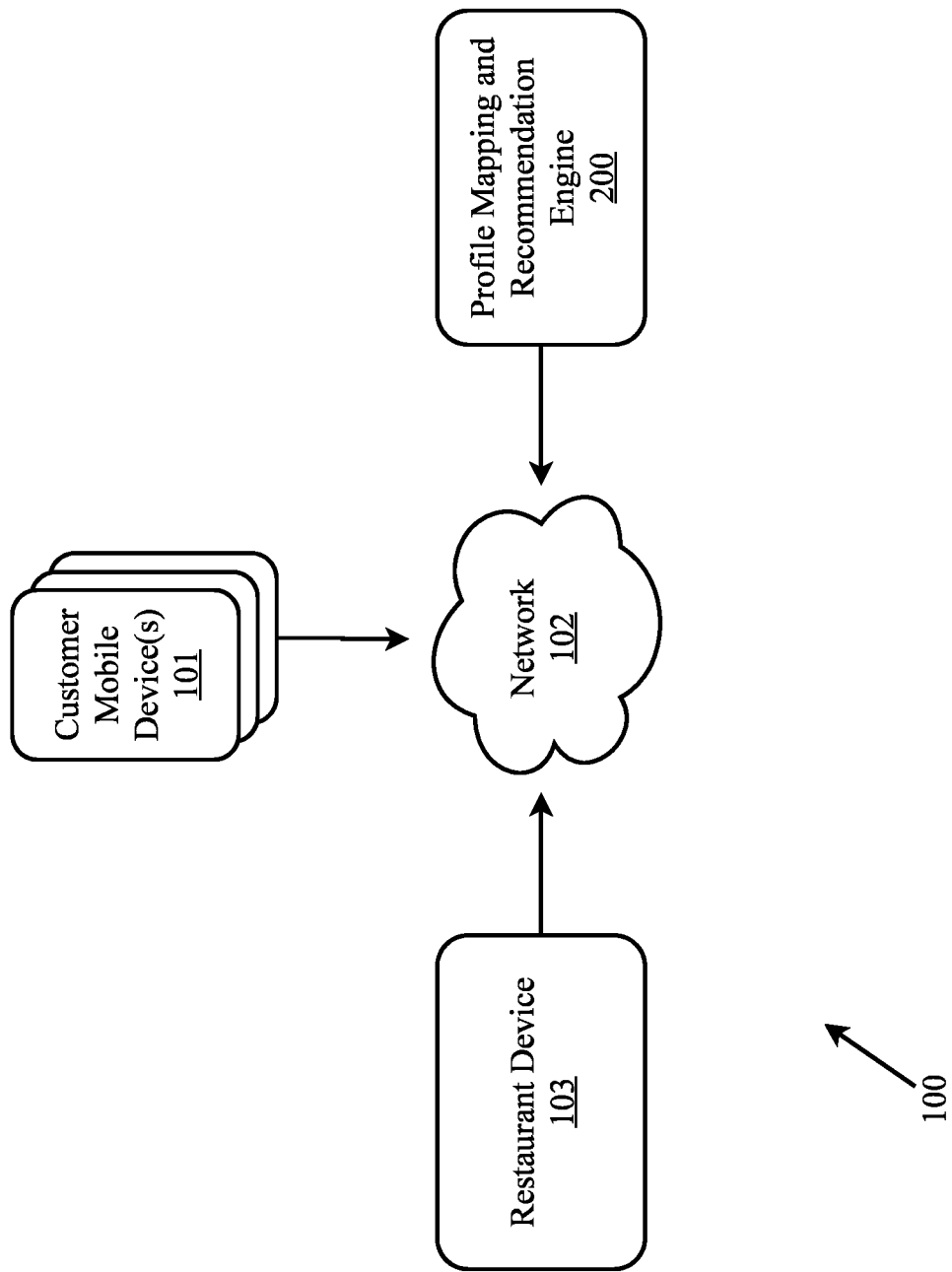

FIG. 1 is a block diagram illustrating an exemplary system architecture 100 for a patron-server matching system. In this embodiment, the patron-server matching system 100 comprises a profile mapping and recommendation engine 200 and a restaurant device 103, which may operate through a network 102 which provides the communication between the components, and may be accessed by one or more customer's mobile device(s) 101. Depending on the embodiment, the recommendation engine may operate on the restaurant device, or on a cloud-based server, or on a customer mobile device, or some combination of these options. For each customer, a profile is created and stored in a profile mapping and recommendation engine 200. A profile mapping and recommendation engine 200 is a computing device that when given a plurality of customer, server, and restaurant information, makes associations and recommendations about matching customers with their ideal servers via machine learning algorithms. A restaurant device 103 is typically a mobile computing device that connects to a restaurant's network 102 that may be used by servers as a point-of-sale or table management device or it may be used by patrons for entertainment or ordering services. According to this embodiment, an additional aspect of the restaurant device 103 is to allow patrons to rate servers, save context templates (see FIG. 3B), manually select servers, or have the profile mapping and recommendation engine 200 choose a server automatically.

In a typical scenario, unique identification numbers from the customer's mobile device 101 are associated with a customer's profile where the customer's profile comprises information such as the customer's name and email address. A plurality of methods may be utilized for registering first time customers. Front desk waitstaff may create a profile on the customer's behalf. The customer could create a profile through a series of questions on a restaurant's device 103, tablet, website, or a mobile application. Creating a profile may be incentivized through free or discounted menu items or other motivational tactics.

Return customers will be automatically detected when that customer's mobile device 101 connects to the restaurant's network 102, more specifically the unique identifying number associated with that device is recognized on the restaurant's network 102. Additional information about new or returning customers may be obtained through patron-server conversations, discounts offered to take surveys, data broker databases, or applications operating on the restaurant device 103.

Servers also create profiles as part of the onboarding process or during initialization of the patron-server matching system 100. Server profiles include personal and professional traits including hobbies, food knowledge, and overall customer rating. Restaurants also create profiles which include their location, themes, ambiance type, food selection, and other attributes. These profiles and their attributes are organized in a computational graph where smaller communities surrounding the servers may be identified. This allows patrons and restaurants to fall within the one or more server community boundaries where the most attributes are shared, and recommendations may be made. Recommendations from the profile mapping and recommendation engine 200 improve as more information is gathered about the customers, servers, and restaurants.

Servers and restaurants may also choose to share their profiles on a decentralized (or centralized in one embodiment) database with other participating restaurants and servers allowing for a professional network where work contracts can be negotiated between servers and restaurants.

Figure 2:
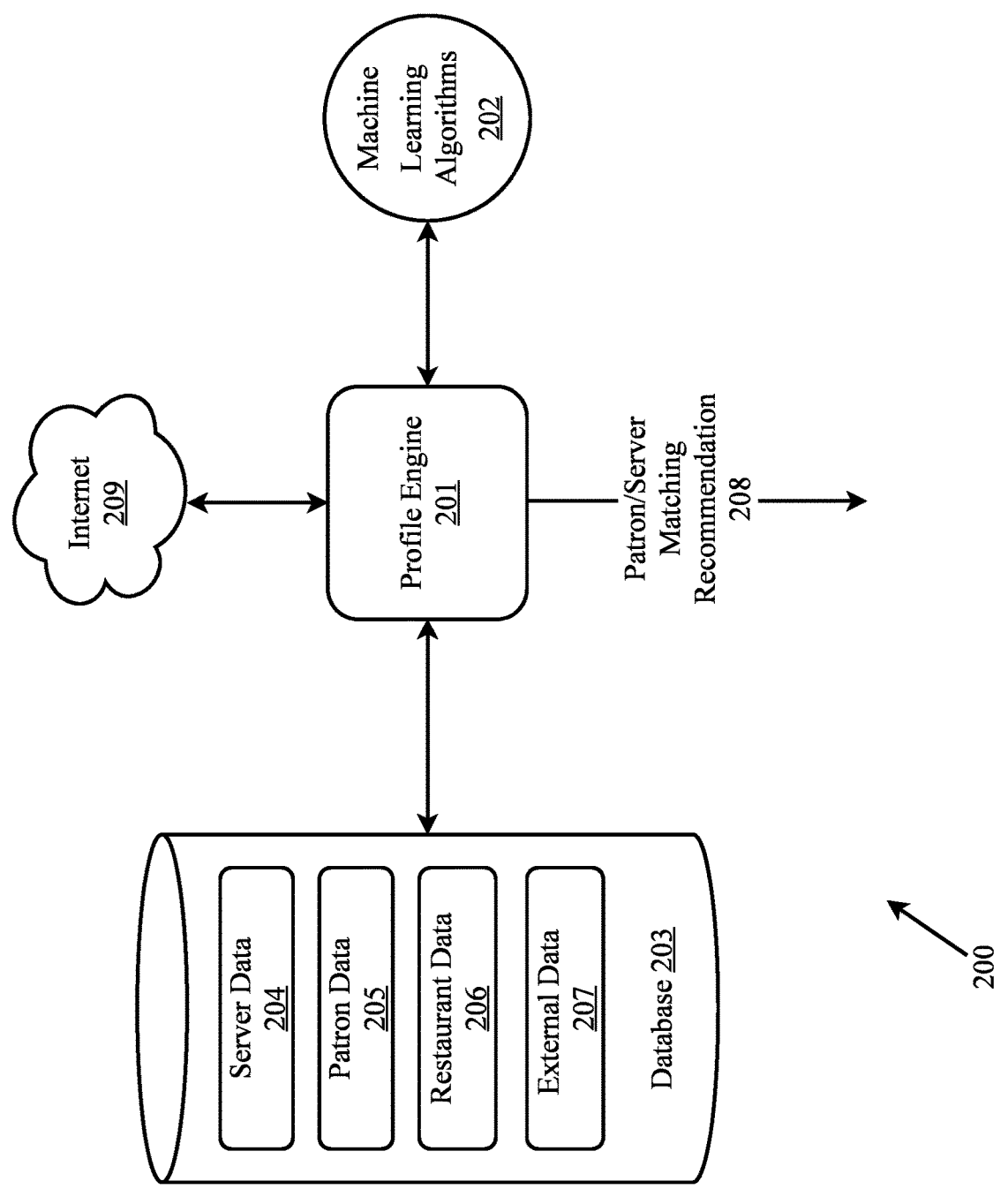
FIG. 2 is a block diagram of an exemplary system diagram for a profile mapping and recommendation engine.

FIG. 2 is a block diagram of an exemplary system diagram for a profile mapping and recommendation engine 200. The primary component is a profile engine 201 that uses machine learning algorithms 202 to provide optimized and ideal matches 208 between patrons and servers. Data rich profiles are stored in a database 203 and comprise server data 204, patron data 205, restaurant data 206, and external factors 207. The data 204, 205, 206, 207 populated within the database 203 may come from any number of sources such as input from a restaurant device 103, webforms, surveys, mobile applications, manual input from servers, and big data (which are extremely large and computationally analyzed data sets which).

The profile engine 201 processes the data through one or more algorithms to associate patrons with servers. In some embodiments, the algorithms are machine learning algorithms which may be trained using training datasets labeled with known patterns of successful match characteristics. Subsequent to being trained, the machine learning algorithms may identify other patterns which are also likely to indicate successful matches.

One method of performing matching using machine learning algorithms is to create a directed graph of relationships, and to run graph analysis algorithms to identify associations within the graph, such as the shortest path between a server and patron, or the path with the greatest total edge weights between a server and a patron (with greater edge weights implying more affinity). The main components of the computational graph are entities, attributes, and the relationships between entities and the attributes. Examples of entities include the names of patrons, servers, and restaurants. Attributes include various items such as personality traits, performance metrics, personal information, business operational data, locality data, ratings, and other attributes belonging to patrons, servers, and restaurants. The relationships are links between attributes and/or entities and are weighted based on the amount of commonality shared between entities.

Figure 4:
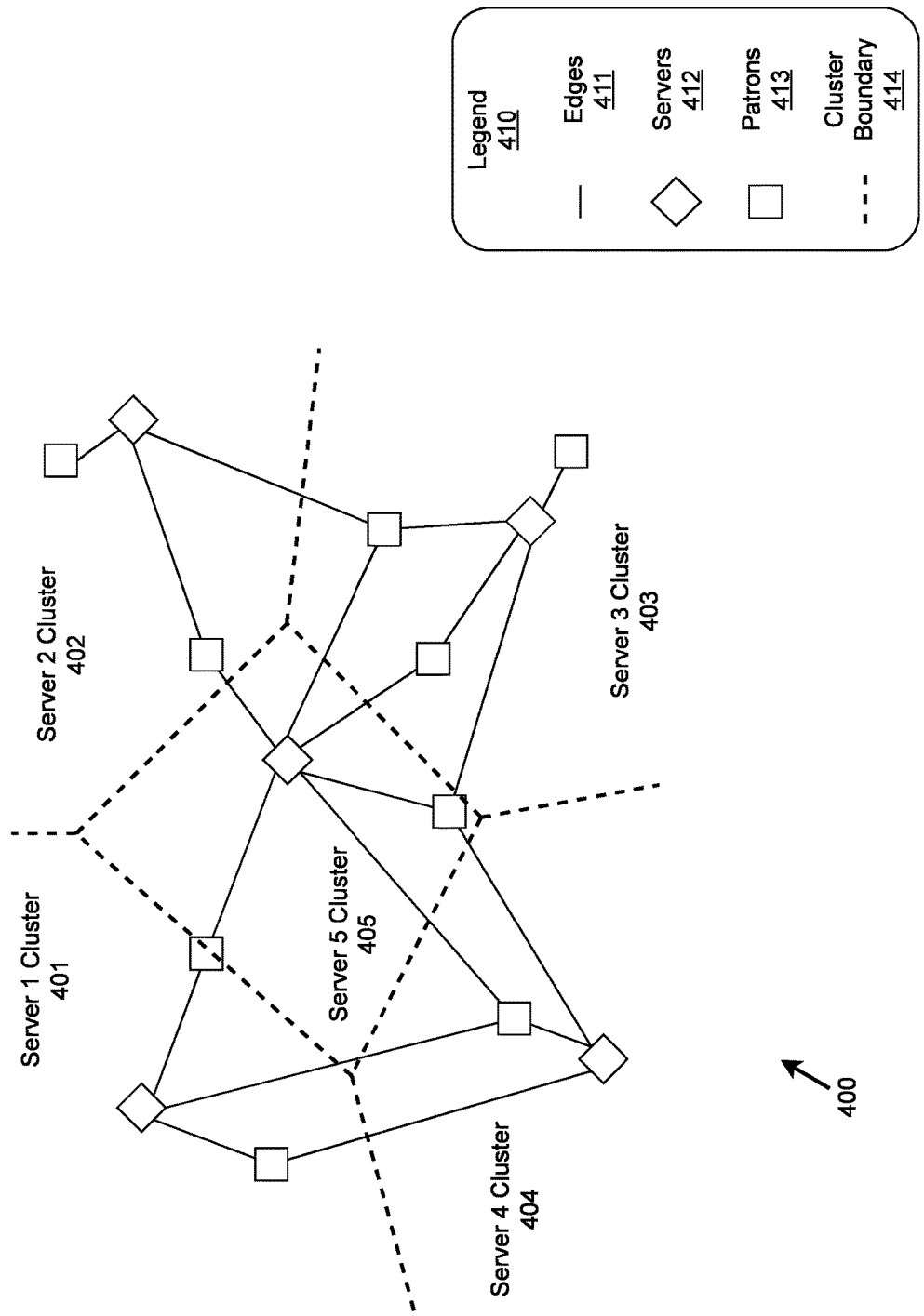
FIG. 4 is a diagram of an exemplary computational graph illustrating the use of cluster analysis for patron-server matchmaking.
Figure 5:
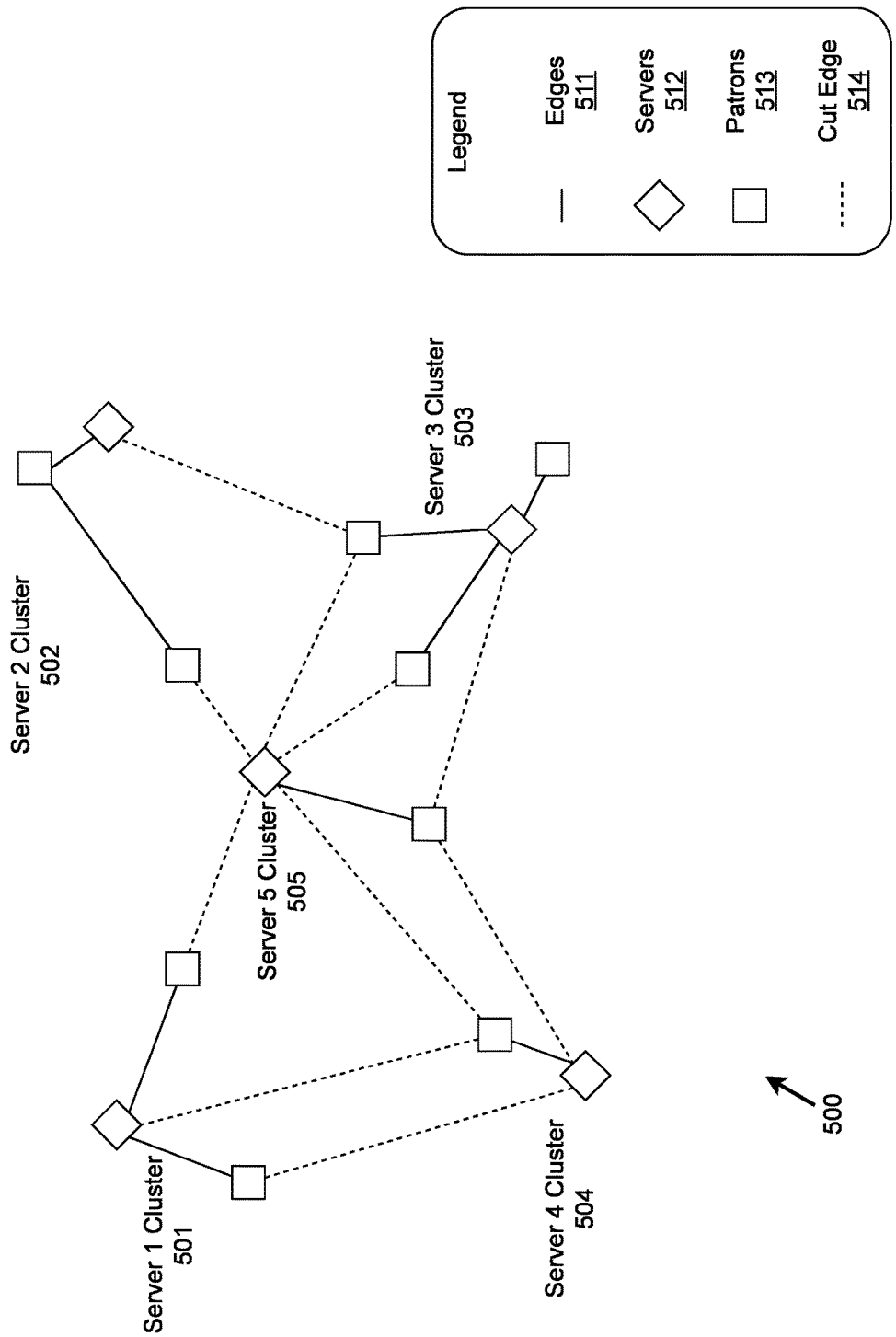
FIG. 5 is a diagram of a portion of a computational graph used for a server-patron matching system.

A description of this process is detailed in FIG. 4 and FIG. 5.

In one embodiment, the profile engine 201 may reach out to varied Internet 209 sources to request private and public databases for further information about patrons, servers, and restaurants. The internet 209 may also be used to create a decentralized (or centralized) network of profile mapping and recommendation engines 200. This network may serve as a hiring or trading platform for servers and restaurants. Allowing participating restaurants and consenting servers to better form cohesive teams and offer temporary work if one restaurant is understaffed among other scenarios. This cuts down on the hiring process and also allows servers to demand higher salaries should their profile rank higher than average.

Figure 3A:
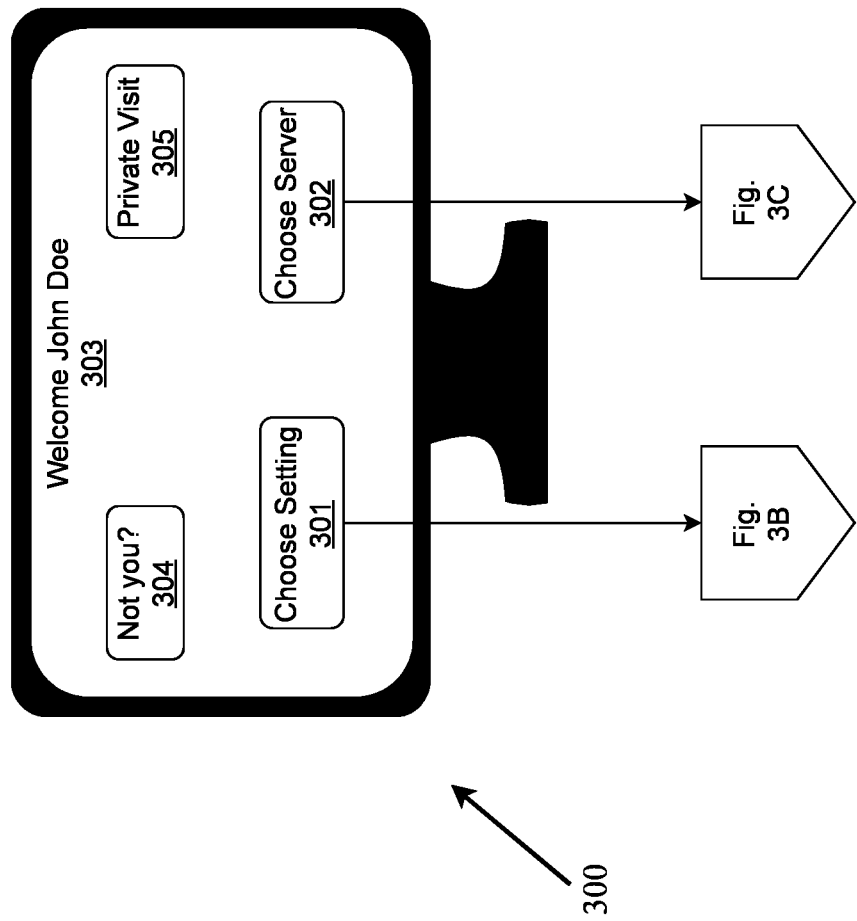
FIG. 3A is a diagram of an exemplary restaurant device for allowing patrons to manually or automatically match with servers.

FIG. 3A is a diagram of an exemplary screenshot 300 of a restaurant device 103 or a customer mobile device 101 for allowing patrons to manually or automatically match with servers. The screenshot 300 shows a display that presents a new or returning patron with a series of options. As described in previously, the customer's mobile device 101 connects to the restaurants network and allows the restaurants device 103 to personalize the customer's experience based on the customer's stored profile. This includes displaying the customer's name 303 and giving him or her the option to change the user 304 in case of an error or in case they are visiting with multiple patrons, all of whom have an account, and lastly the option to dine privately 305 without using the patron-server matching system. In the case where "Not you?" 304 is selected, a request is made to scan the restaurant's network for other returning patrons. "Private Visit" 305 hides that specific customer's mobile device from showing up in scans from other patrons and servers alike.

The option to choose a setting 301 will allow the user to select from a series of subsequent prompts that change their server preferences (and other preferences in some embodiments) based on the context of their visit. The choose server 302 menu option allows the patron to quickly select a server of his choice or allow the system to choose for him.

Figure 3B:
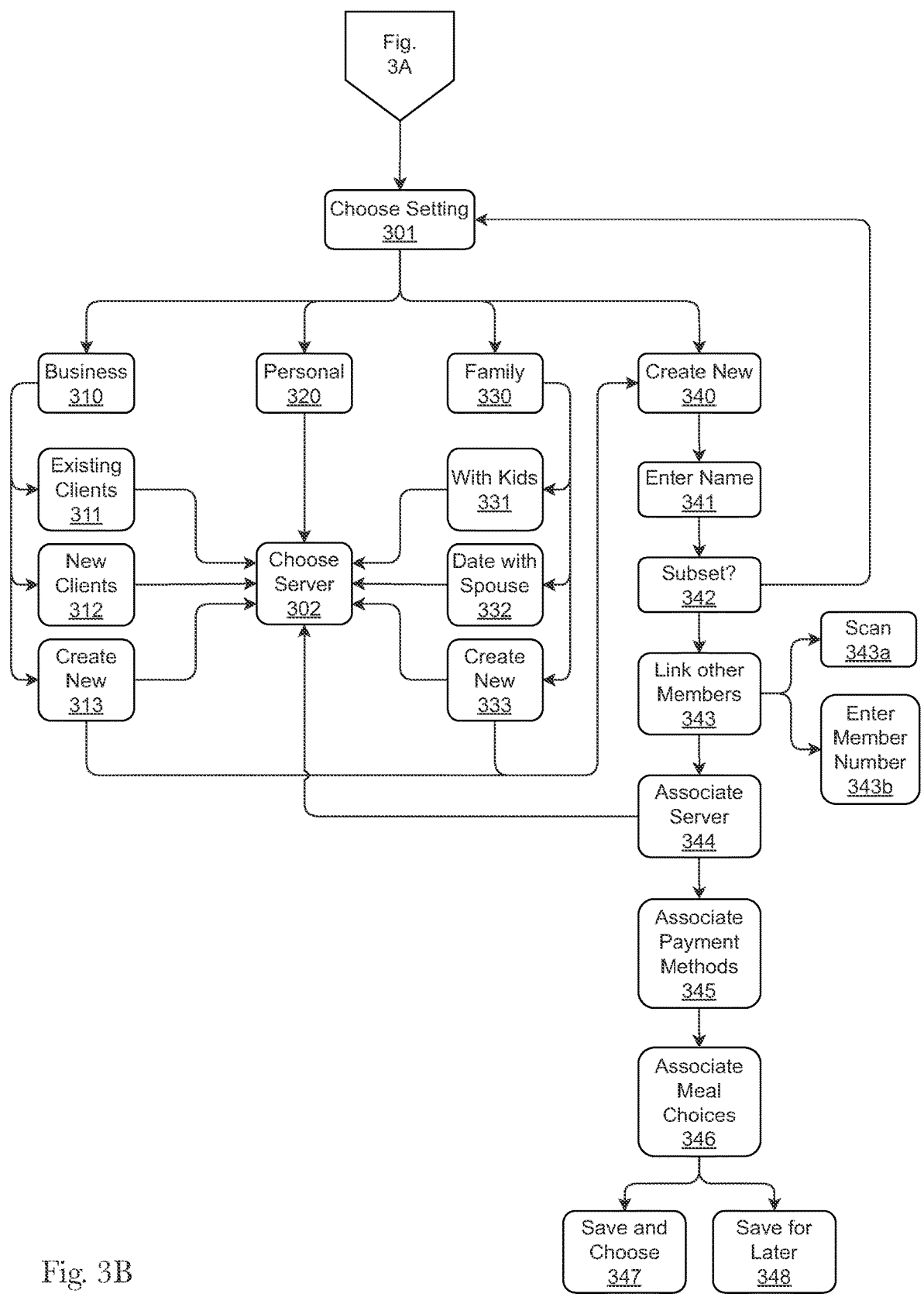
FIG. 3B is a flow diagram illustrating one exemplary method for allowing patrons to choose a server based on the context of their visit on a restaurant device.

FIG. 3B is a flow diagram illustrating one exemplary method for allowing patrons to choose servers based on the context of their visits on a restaurant device 103. When a patron selects choose setting 301 on a restaurant device 300, he or she is presented with at least the option to create a new 340 setting. This is typical for first time patrons but returning patrons may have saved settings such as business 310, personal 320, or family 330. In the scenario where a patron is creating a setting for the first time, the patron will select "Create New" 340. The patron will be prompted to enter a name 341 for the setting, whether the setting is a subset 342 of another setting, which a new user will not have. The patron will also have the ability to link other registered patrons 343 such as a spouse or a business partner. There, the patron will be able to scan patrons currently connected to the restaurant's network 343a or add them by member number 343b. If a patron has already rated servers or if the patron desires a particular server, he or she may do so at the next step "Associate Server" 344. The patron may set up default payment methods 345 and meal choices 346 (and other preferences in some embodiments) and then decide between saving the setting and using it 347 or saving it for later 348.

Should the patron already have saved settings, they may choose one of those. As an example, in this diagram the patron may choose business 310, that has sub settings "Existing Clients" 311 or "New Clients" 312 or they may choose to create a new setting 313. Other choices may include "Family" 330 with sub settings "With Kids" 331, "Date with Spouse" 332, or also "Create New" 333. After a patron has chosen their preferred setting, the next prompt "Choose Server" 302 will allow them to choose a server for that specific setting.

Figure 3C:
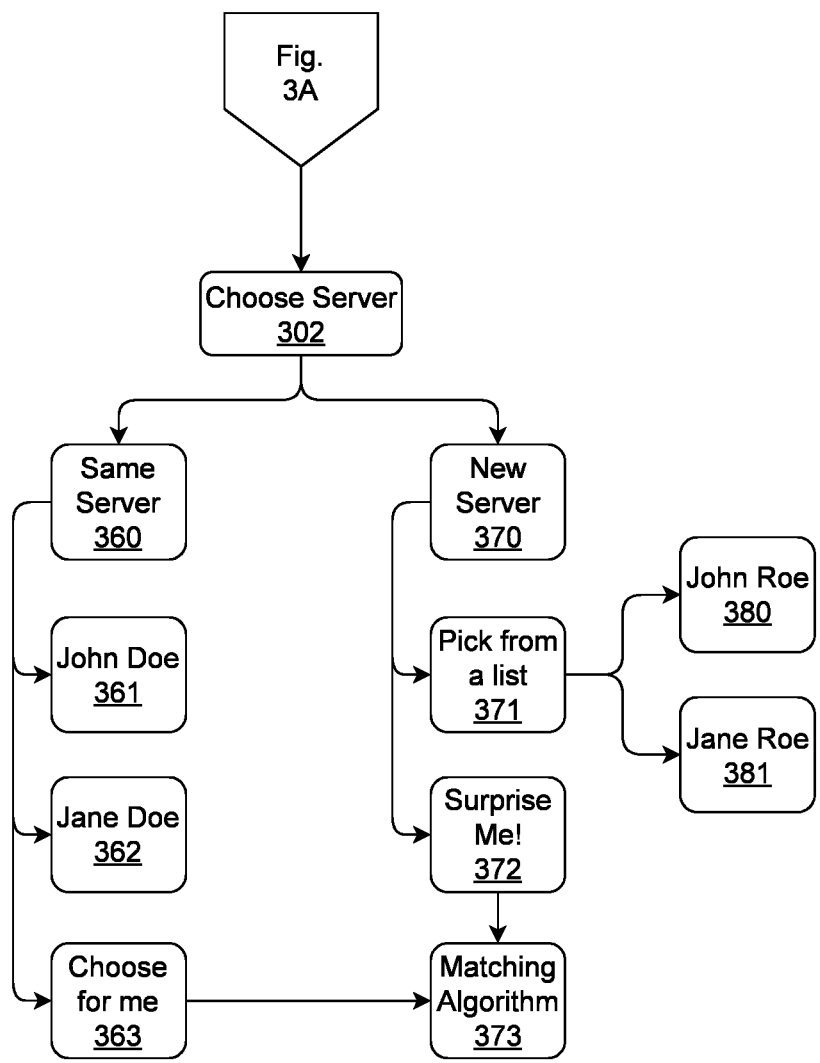
FIG. 3C is a flow diagram illustrating an exemplary method for allowing patrons to choose a server on a restaurant device.

FIG. 3C is a flow diagram illustrating an exemplary method for allowing patrons to choose a server on a restaurant device 103. When a patron selects "Choose Server" 302 either from the main screen as in FIG. 3A or through selecting a setting as in FIG. 3B, the patron will be presented with an option to choose a server they have rated in the past 360 or to select a new server 370. Should the patron choose "Same Server" 360 then a list of already rated servers (John Doe 361 and Jane Doe 362 in this example) will appear along with an option 363 to allow the patron-server matching system 100 to choose for him or her using a matching algorithm 373.

Should "New Server" 370 be selected, options to pick from a list 371 of unrated servers (John Roe 380 and Jane Roe 381 in this example) or to again, choose for the patron (which may be in the form of some colloquial quip to make it fun for the patron) 372 will be available. Should either "Choose for me" 363 or "Surprise Me! 372 be selected, then a recommendation request is made to the profile mapping and recommendation engine 200.

FIG. 4 is a diagram of an exemplary computational graph 400 illustrating the use of cluster analysis for patron-server matchmaking. This diagram of an exemplary graph 400 and legend 410 shows a restaurant's servers 412, patrons 413, and their edges 411 that form five clusters 401, 402, 403, 404, 405 from which a profile mapping and recommendation engine can determine the ideal servers 412 for each patron 413. For example, in this diagram, it can be seen that certain patrons (indicated by squares) are solidly within the cluster of a particular server (indicated by diamonds), indicating a good match between the attributes of the patron and the server. Some patrons fall near the dividing line between servers, indicating that either server would be a good match, but that neither is ideal, as would be the case if the patron was solidly in the server's cluster.

This example is accomplished by a modified use of Google's PageRank algorithm coupled with clustering algorithms to highlight local community structure within the context of a larger network. There are many well-known cluster algorithms including k-means, spectral clustering, Markov cluster algorithms, and many more. However, PageRank is useful because it provides necessary structural relationships between nodes and is especially well-suited for clustering analysis. While PageRank was introduced as a web page graph, PageRank is well defined for any graph.

The main parameter in deriving the graph vectors between nodes is a scaling constant that includes two variance measures which can be used to automatically find the optimized values for this scaling constant in order to determine distances and clusters. The first variance measures discrepancies between the vectors of patron 413 nodes and possible closest server nodes 412 by the probability distribution. The second variance measures large discrepancies between patron 413 nodes and the overall stationary distribution. The vectors determined by this constant use a set of centers of mass (servers 412) to find the cluster boundaries 414 within the graph. Ideal solutions occur when the first variance is small, which indicate the estimates for the upper bounds of a cluster is accurate. When the second variance is large, then the centers of mass are quite far from the stationary distribution, capturing a community structure. The goal of the clustering PageRank algorithm is to find the appropriate scaling constant such that the first variance is small, but the second variance is large thus leading to a series of optimized clusters.

FIG. 5 is a diagram of an exemplary computational graph 500 illustrating the use of betweenness clustering for patron-server matchmaking. Betweenness in the art refers to the shortest path between a node or edge in relation to all other nodes or edges 511. This embodiment starts with a given directive to ensure at least one and no more than one server 512 exists within each cluster 501, 502, 503, 504, 505. The distance of the patron nodes 513 relative to each server node depends on the number of similar attributes shared with each server node. The more attributes a patron node shares with a server node, the closer the patron node is to that particular server node. The betweenness clustering algorithm measures all connected patron 513 and server 512 nodes, and all but the shortest edge is cut 514. This results in five distinct clusters 501, 502, 503, 504, 505 (indicated by solid lines between nodes) from which ideal patron-server matches may be recommended.

Attributes used to form edges comprise personal baseline information such as age, hobbies, cuisine preference, and birthplace. Server baseline metrics include previous customer ratings, cuisine knowledge, and work performance metrics such as number of upsells, table turn time, or server errors per guest. In one embodiment, servers and patrons may link social media accounts that provide that additional personal information and interests. Profiles of servers, patrons, and restaurants may include extraneous information not needed for the graph analysis such as resumes, job listings, menus, and contact information. Games on a restaurant device may be designed to ask the patrons about themselves and store that information in their profile. Customer's emails and phone numbers may be linked to datasets from data brokers and other big data sources.

Another embodiment of this clustered analysis would be to match servers with restaurants where the center of mass of each cluster would change from servers to restaurants, and clusters would be bound by geographical ranges. This embodiment may make use of a web accessibility feature rather than a restaurant device 103, where servers and restaurant managers/owners may use it to negotiate temporary or permanent working contracts.

FIG. 6 a block diagram illustrating an exemplary system architecture for a location-informed matching system 600. The systems and methods contained in this and succeeding figures (FIG. 6-8) make improvements to preceding embodiments (FIG. 1-5) by incorporating historical and real-time geospatial information into patron, server, and restaurant profiles. This allows for more accurate matching between patrons, servers, and restaurants by creating a more complete computational graph. Profiles may now include accessing visitation, travel, and other geospatial data from multiple sources such as GOOGLE MAPS, BING MAPS, and other third-party and proprietary geolocation and data collection services 601. Profiles may also receive or retrieve streams or discrete data queries from GPS enabled devices 602 and may also comprise the other forms of already established external data 207 from previous embodiments. According to one embodiment, the extended profiles may be stored in a table or database 203 until retrieved by a computational graph algorithm 202.

The machine learning algorithms 202 used herein may employ values such as "like", "dislike", "neutral", "must have", "must not have", etc. when creating associations between both profiles and attributes. Restaurant profiles may now also include information about its ambiance, type of food, prices, relation to other restaurants, and similarity to other restaurants. These attributes may be used in determining a patron's affinity for patronizing an establishment. Similarly, patron and server profiles may now use geospatial data to infer more attributes of the person such as frequented venues, establishments, and events which may lead to more personable attributes such as "likes sports", "dislikes Thai food", "must have handicap seating," etc. Each profile attribute may also include an indication of the propensity or affinity of the person to attend, patronize, or otherwise engage with an establishment or event. Attributes may be weighted vectors or edges in a computational graph or normalized on some scale like 0 to 10. Patterns of patron and server behavior may be inferred from travel data such as habitual-excessive speeding while driving may indicate an enthusiasm for extreme activities such as skydiving or preferences towards highly-stimulating dining experiences.

Any unlabeled input data to the machine learning algorithms 202, granted the model chosen requires labeled data, may be explicitly collected from surveys, third-party apps, or other feedback mechanisms. Unlabeled data may also be labeled implicitly using a second machine learning model 202 trained on geospatial data. For example, if the type of food is not known, natural language processing 202 may be used on the menu. Another example of implicitly labeling data is when the ambiance is not known, wherein a third machine learning algorithm 202 makes a determination of the ambiance based on other patron profiles. For instance, in analyzing all patrons who visited an establishment, how likely is each patron is to visit it based on his or her preferences. If a significant portion of the patrons only dine at fine-dining with a low-light and soft-music ambiance, the model can be more certain that if those patrons also visit the establishment of unknown ambiance, that the ambiance is likely similar. An image classifier algorithm may also be used to determine ambiance from user- or business-submitted photos, whether submitted to a third-party app like YELP or to the system 600 itself. Locality data may also be used to determine attributes about patrons, servers, and restaurants by analyzing economic and demographic data surrounding the patron's, server's, or restaurants' home or business location. The labels can also be based on other proxy indicators like place visits (Location history) or place clicks (Web/Search history.)

Location data may also be used in varying degrees of granularity. For example, a patron's mobile device GPS 602 may report to the system 600 his or her location as they travel through an airport. Giving such information as to which shops they patronize and if they are flying domestic or internationally. Another example is tracking a patron as they shop at a mall. A machine learning model 202 may acquire a high confidence of the sex of a patron based on the type of mall store visited and time spent in each store and whether or not the patron has children. GPS data of patrons visiting playgrounds, schools, and sporting arenas is also a high indicator of having children, as another example. This information, in one instance, could be used to match a patron with a restaurant that offers a kid's menu even if the patron's profile makes no mention of children. Additionally, attributes of customer types (e.g., male/female, age range, repeat/new, etc.) may be used to determine establishment attributes (e.g., luxury, bargain, online, offline, etc.) if the attribute is unknown.

The various data ingested may not necessarily be tied to geolocation, such as purchasing history, media viewing history, automotive records, social networking activity, and include data from credit card processors, banks, cable companies, television rating services, microblogging services, location check-in services, or various other social networks. In some cases, patron, server, and restaurant classification according to geolocation may be supplemented with such data, for instance, according to the appearance of various keywords in social network posts, linkages between users indicated by social networks, or patterns in buying or reviewing behavior.

FIG. 7 is a diagram of an exemplary computational location graph superimposed on a regional outline for illustrating the use of location data analysis for patron-restaurant matchmaking. The regional outline Washington State may not actually be implemented in a computational graph and is illustrated here only for reference. However, is it possible that computational graph outputs may be superimposed over images and even other graphs if so desired. Using the features described above in FIG. 6 with a computational graph enables the computational graph to have a location aspect from which new data may be derived. With regard to matching patrons with restaurants, historical travel data may allow machine learning models to determine the best restaurant for that patron at the given time. For example, if a patron frequents a first breakfast chain 703a-n for dinner in his or her hometown 701, but travels out of town 702, the machine learning model may offer a second as-similar-as-possible breakfast chain 705 over a less-similar breakfast chain 704 in the new location 702 if the first one 703a-n is not available. Training such machine learning models may entail ingesting as much data as possible and either having an unsupervised model, or a supervised model where a user can guide the learning process.

With regard to matching patrons with servers, location data may be used to see if any servers frequent the same establishments as the patron or if they share some pattern of behavior or event attendance. Again, these types of attributes may be manually entered into each entity's profile, however, the power of ingesting location data into machine learning models infers these types of attributes without the need for a person to manually enter them.

Another new feature now possible comprises reducing the dimensionality of patron and restaurant profiles to create a new computational location graph, not for the purposes of matching individual patrons with restaurants, but rather extracting and analyzing business data about a restaurant or chain of restaurants. Reducing the dimensionality of patron and restaurant profiles is simply extracting only the relevant attributes of profiles needed for the computational location graph. For example, a patron's favorite Italian dish is not needed when analyzing a chain of Mexican restaurants within a city. Thus, when computing all the patrons in the database in relation to an establishment, only the primary relevant attributes are initially used. This reduces computational cost and time. However, secondary attributes may be calculated afterwards providing a deeper and richer understanding of an establishment's patrons.

This computational location graph then may present previously unknown data to the business. Such as showing hotspots of their patrons which could be used to for targeted advertising. Because location data may also be embedded with timing data, the computational location graph may also show the time aspect of these hotspots. For example, if a suburb has multiple patrons of a restaurant and all or most of those patrons commute across a bridge on workdays, then a business could pay for a time slot on a digital billboard during that specific timeframe rather than pay for an all-day advertisement. The richness of this computational location graph embodiment relies on the fullness of patron and restaurant profiles. That is why the combination of location data and machine learning is used to infer the many attributes of both patrons and restaurants without having to actively acquire such information. For example, even inferring the age of patrons which may be off by two or three years is more valuable than not knowing their ages at all.

FIG. 8 is a flow diagram illustrating an exemplary method for matching patrons, servers, and restaurants. In a first step 801, receive or retrieve information about a patron, server, and restaurant. It is preferable to obtain information on a plurality of a patrons, servers, and restaurants to best train various machine learning models in generating an accurate computational location graph. A second step 802 entails storing the received information in a relevant profile belonging to the patron, server, or restaurant in a database. In a third step 803, communicate with a patron's mobile device, receiving a unique identifier and match request that is linked to a specific patron's profile. This unique identifier may be an IMEI, MAC Address, device_ID, a third-party account, biometrics, etc. In a fourth step 804, match the specific patron to a plurality of potential servers, restaurants, or both using a profile mapping and recommendation engine. This entails using location data or other data disclosed above to identify the location or the specific restaurant the patron is at. If the match request is to match the patron with a server at a restaurant, then the specific patron's profile is retrieved from the database along with retrieving a plurality of the server profiles from the database that are currently working at the restaurant and retrieving the restaurant profile from the database. If the match request is to find a patron a restaurant, then the patron's profile and a plurality of restaurants within a certain vicinity is retrieved from the database. Either way, the next step 805 is to process the specific patron's profile, the plurality of server profiles (if needed according to the match request), and the plurality of restaurant profiles (if needed according to the match request) through a computational graph and use graph analysis algorithms to identify the highest-associated server and restaurant profiles in relation to the specific patron's profile. In a sixth step 806, present the plurality of potential matches to the patron's mobile device, and in a seventh step 807, receive a match selection from the patron's mobile device.

Upon receiving the match request, many possible next steps are anticipated such as: sending a reservation request to a restaurant; placing a call to a restaurant, sending the match selection to a restaurant portal so the restaurant can facilitate the patron-server match; update the relevant profiles in the database based on the match selection; use the match selection as backpropagation or a type of training data in a machine learning model; populate a menu selection on the patron's mobile device; and so forth.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof.

In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some aspects, systems may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

In some aspects, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for matching patrons with servers and restaurants, comprising:
   a computing device comprising a memory, a processor, and a non-volatile data storage device;
   a portal comprising a first plurality of programming instructions stored in the memory, and operating on the processor, wherein the first plurality of programming instructions, when operating on the processor, causes the computing device to:
- receive patron data for a patron comprising patron attributes;
- receive server data for a plurality of servers, the server data comprising server attributes;
- receive restaurant data for a plurality of restaurants, the restaurant data comprising restaurant attributes;
- receive a match request from a patron's mobile device;
- match the patron to a a highest-associated server and a highest-associated restaurant using a profile mapping and recommendation engine;
- present the match results to the patron's mobile device;

a profile mapping and recommendation engine comprising a second plurality of programming instructions stored in the memory, and operating on the processor, wherein the second plurality of programming instructions, when operating on the processor, causes the computing device to:

generate a directed graph from the patron attributes, the server attributes, and the restaurant attributes, wherein:
- the patron, the plurality of servers, and the plurality of restaurants are represented as nodes of the directed graph; and
- the edges between the nodes are determined by a betweenness clustering algorithm wherein more attributes shared between any two nodes result in a shorter edge between those two nodes;

select the highest-associated server being the server represented by the node with the shortest edge to the node representing the patron and the highest-associated restaurant being the restaurant represented by the node with the shortest edge to the node representing the highest-associated server; and send the highest-associated server and the highest-associated restaurant to the portal.

2. The system of claim 1, wherein the patron attributes, server attributes, and restaurant attributes comprise location information.

3. The system of claim 1, wherein a portion of the patron data, server data, or restaurant data is received from a social media account.

4. The system of claim 1, wherein GPS data is received from the patron's mobile device.

5. A method for matching patrons with servers and restaurants, comprising the steps of:
- receiving patron data for a patron comprising patron attributes;
- receiving server data for a plurality of servers, the server data comprising server attributes;
- receiving restaurant data for a plurality of restaurants, the restaurant data comprising restaurant attributes;
- receiving a match request from a patron's mobile device;
- matching the patron to a a highest-associated server and a highest-associated restaurant using a profile mapping and recommendation engine;
- generating a directed graph from the patron attributes, the server attributes, and the restaurant attributes, wherein:
- the patron, the plurality of servers, and the plurality of restaurants are represented as nodes of the directed graph; and
- the edges between the nodes are determined by a betweenness clustering algorithm wherein more attributes shared between any two nodes result in a shorter edge between those two nodes;
- selecting the highest-associated server being the server represented by the node with the shortest edge to the node representing the patron and the highest-associated restaurant being the restaurant represented by the node with the shortest edge to the node representing the highest-associated server; and
- presenting the match results to the patron's mobile device.

6. The method of claim 5, wherein the patron attributes, server attributes, and restaurant attributes comprise location information.

7. The method of claim 5, wherein a portion of the patron data, server data, or restaurant data is received from a social media account.

8. The method of claim 5, wherein GPS data is received from the patron's mobile device.

* * * * *